March 16, 1926.

B. McCORMICK 1,577,337

DYNAMO ELECTRIC MACHINE

Filed April 13, 1925

INVENTOR
Bradley McCormick
BY L.E. Huffman
ATTORNEY

Patented Mar. 16, 1926.

1,577,337

UNITED STATES PATENT OFFICE.

BRADLEY McCORMICK, OF ST. LOUIS, MISSOURI, ASSIGNOR TO WAGNER ELECTRIC CORPORATION, OF ST. LOUIS, MISSOURI, A CORPORATION OF DELAWARE.

DYNAMO-ELECTRIC MACHINE.

Application filed April 13, 1925. Serial No. 22,515.

*To all whom it may concern:*

Be it known that I, BRADLEY MCCORMICK, a citizen of the United States of America, residing at the city of St. Louis, State of Missouri, United States of America, have invented a certain new and useful Dynamo-Electric Machine, of which the following is such a full, clear, and exact description as will enable anyone skilled in the art to which it appertains to make and use the same, reference being had to the accompanying drawings, forming part of this specification.

My invention relates to dynamo-electric machines and particularly to self-excited synchronous motors, compensated asynchronous motors, and converters, whether of the single or polyphase type, and pertains to means for improving commutation.

Figure 1:
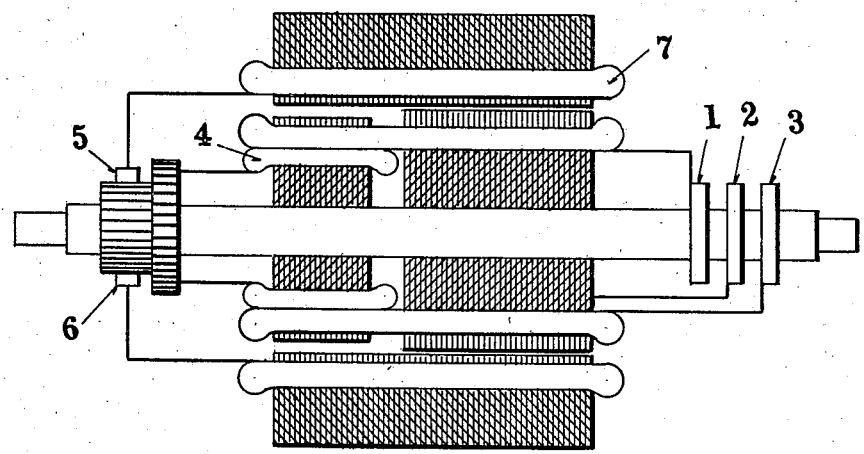
Figure 2:
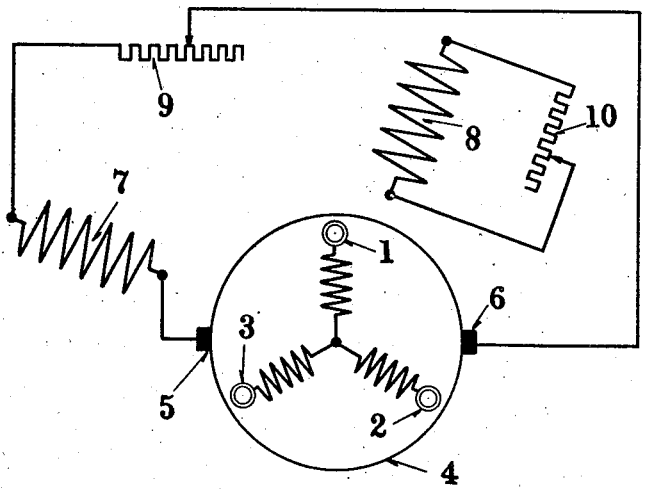

In the accompanying drawing Figure 1 is a view partly in section and partly diagrammatic, illustrating a synchronous induction motor embodying my invention, and Figure 2 is a diagrammatic view showing the circuit connections of this motor.

The rotor, which in the machine shown is the inducing member, is provided with a polyphase winding supplied with line current through slip rings 1, 2, 3, and with a commuted winding 4, which may or may not be interconnected with the polyphase winding. The stator, or induced member, is provided with an exciting winding 7 in circuit with the commuted winding by means of the brushes 5, 6, through adjustable resistance 9. The exciting winding is preferably displaced by a small angle from the axis of the brushes. The induced member is also provided with a starting winding 8 displaced from the exciting winding and closed on itself over adjustable resistance 10.

Referring to the location of the windings on the laminæ of the motor, the winding 7 embraces all of the stator laminations and the polyphase winding embraces all of the rotor laminations. In order that not sufficiently high voltage may exist between the commutator segments to result in undue sparking at the brushes, the commuted winding 4 is caused to embrace a portion only of the rotor laminations.

According to my invention I further improve the commutating characteristics of the machine as thus far described, by so dimensioning the laminæ that the air gap between the stator and rotor at points adjacent to the commuted winding, is of greater length than between the remaining portions of the rotor and stator structures. Preferably, this is accomplished by making the diameter of the rotor laminæ embraced by the commuted winding, somewhat smaller than the diameter of the remainder of the rotor laminæ. The increase in length of air gap at the location referred to improves commutation by causing the proportion of the magnetic lines linking with the commuted winding to the total magnetic lines to be considerably less than the proportion of the length of rotor laminations embraced by that winding to the total length of the rotor laminations. Thus the voltage at the brushes is further reduced with consequent improvement of commutation and without materially increasing the ampere turns for producing the magnetic field of the machine, since the most suitable air gap dimension may be employed between the major portion of the rotor and stator structure. The commutation is also improved by reason of the fact that by the means described the higher harmonic fields, and the field fluctuations as rotor and stator teeth pass, are reduced.

My invention is particularly useful from a manufacturing standpoint in that when the commutator voltage is too high in a machine as first assembled, due to variations in materials and workmanship, or to other causes, it can readily be reduced by cutting down the diameter of the portion of the laminæ embraced by the commuted winding without disturbing any of the windings or connections.

Having fully described my invention, what I claim as new and desire to secure by Letters Patent of the United States is:

1. In an alternating current motor, the combination of an induced member, an inducing member provided with an inducing winding and with a commuted winding, said commuted winding longitudinally embracing a smaller portion of the laminations of the inducing member than embraced by the inducing winding, the length of air gap between the induced member and the portion of the inducing member embraced by the commuted winding being different from that between the induced member and the remainder of the inducing member.

2. In an alternating current motor, the combination of an induced member, an inducing member provided with an inducing winding and with a commuted winding, said commuted winding longitudinally embracing a smaller portion of the laminations of the inducing member than embraced by the inducing winding, the length of air gap between the induced member and the portion of the inducing member embraced by the commuted winding being greater than between the induced member and the remainder of the inducing member.

3. In an alternating current motor, the combination of an induced member provided with an exciting winding, of an inducing member provided with an inducing winding and with a commuted winding in circuit with the exciting winding, said commuted winding longitudinally embracing a smaller portion of the laminations of the inducing member than embraced by the inducing winding, the length of air gap between the induced member and the portion of the inducing member embraced by the commuted winding being greater than between the induced member and the remainder of the inducing member.

4. In an alternating current motor, the combination of an induced member provided with such excitation means only as will produce a uniform distribution longitudinally of exciting ampere turns over said member at all loads, an inducing member provided with an inducing winding, and a commuted winding on the inducing member for supplying current to the excitation means, the conductors of said inducing winding embracing all of the laminations of the inducing member and the conductors of the commuted winding embracing a portion only of said laminations, the length of air gap between the induced member and the portion of the inducing member embraced by the commuted winding being greater than between the induced member and the remainder of the inducing member.

In testimony whereof, I have hereunto set my hand this the 7th day of April, 1925.

BRADLEY McCORMICK.